Oct. 16, 1945. M. E. PHILLIPS 2,386,881
NUT HARVESTER
Filed March 6, 1943 4 Sheets-Sheet 1

INVENTOR
M. E. Phillips
BY
ATTORNEYS

Oct. 16, 1945.  M. E. PHILLIPS  2,386,881
NUT HARVESTER
Filed March 6, 1943  4 Sheets-Sheet 2
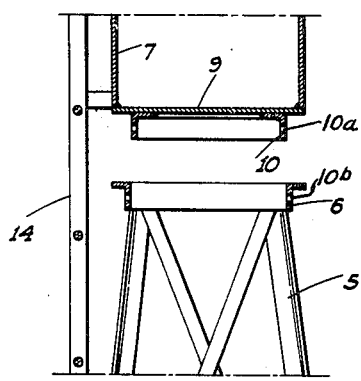
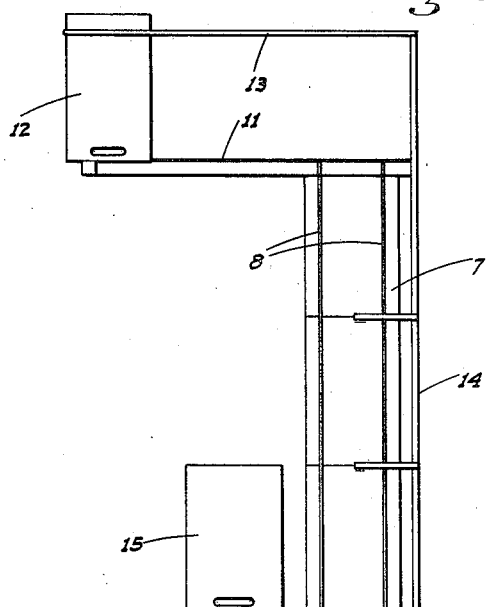
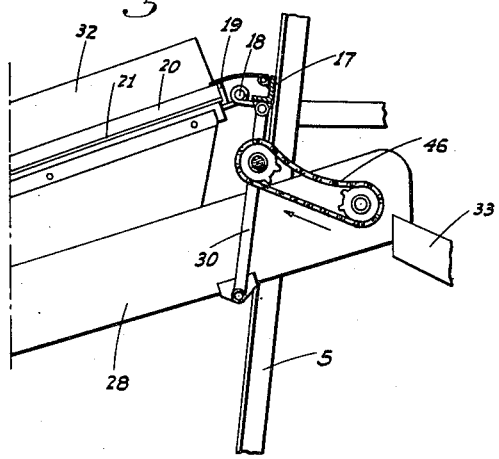
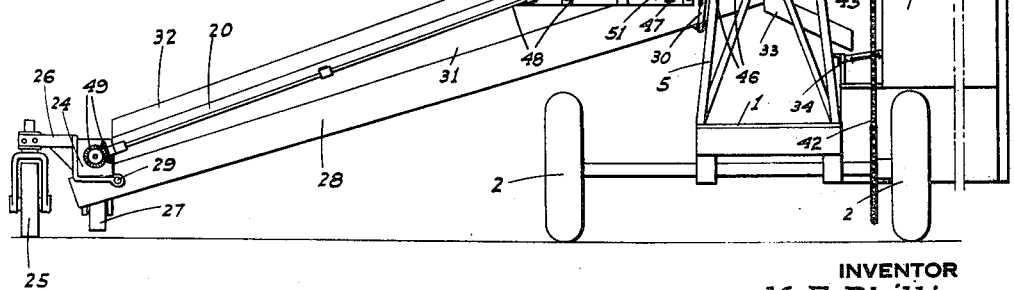
INVENTOR
M. E. Phillips
BY
ATTORNEYS

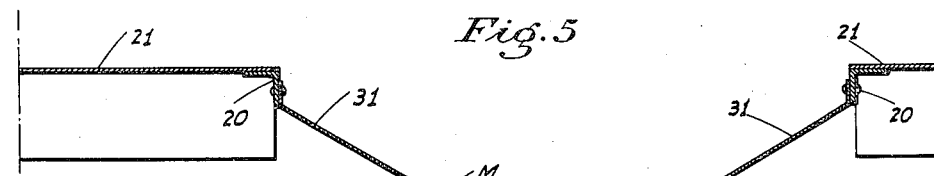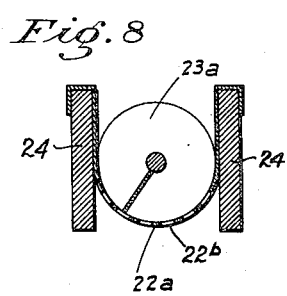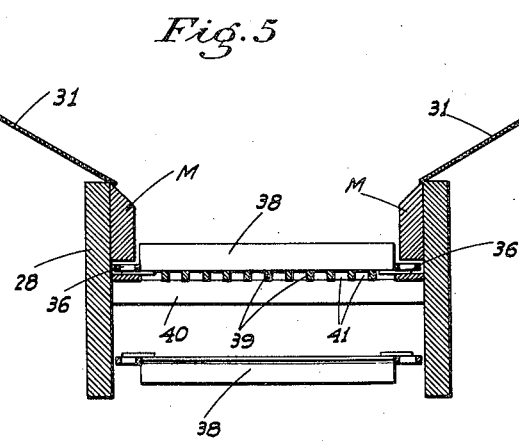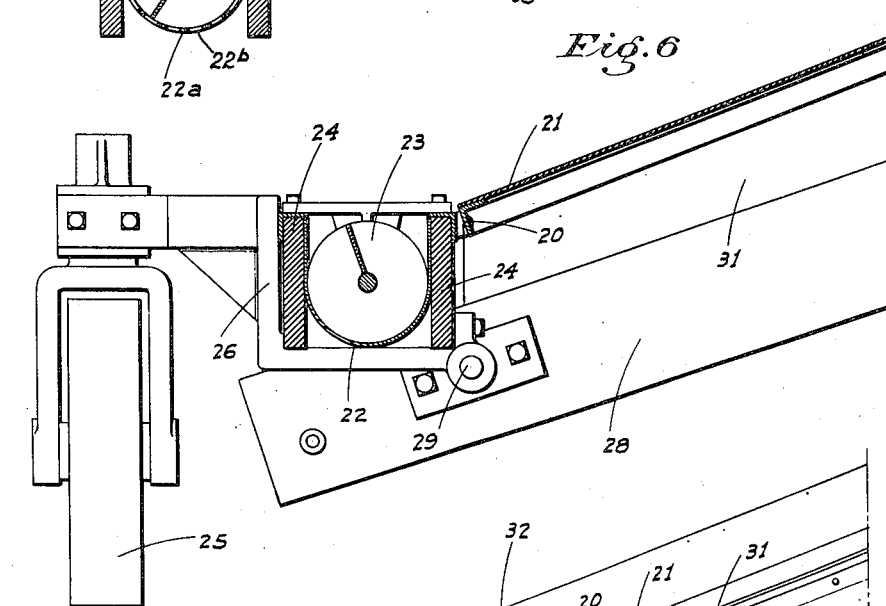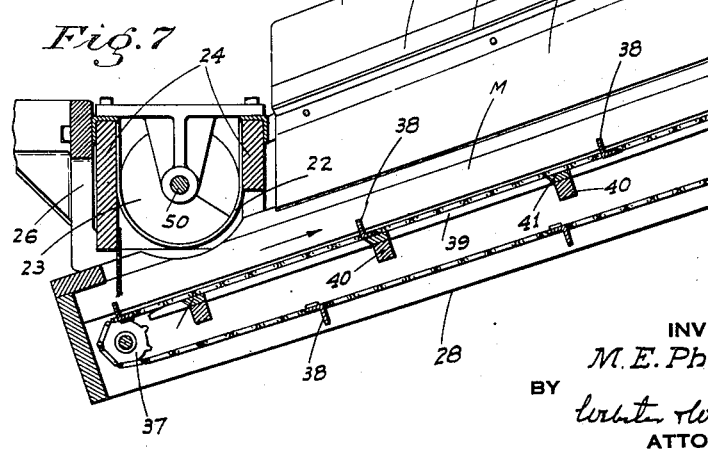

Oct. 16, 1945.  M. E. PHILLIPS  2,386,881
NUT HARVESTER
Filed March 6, 1943  4 Sheets-Sheet 4
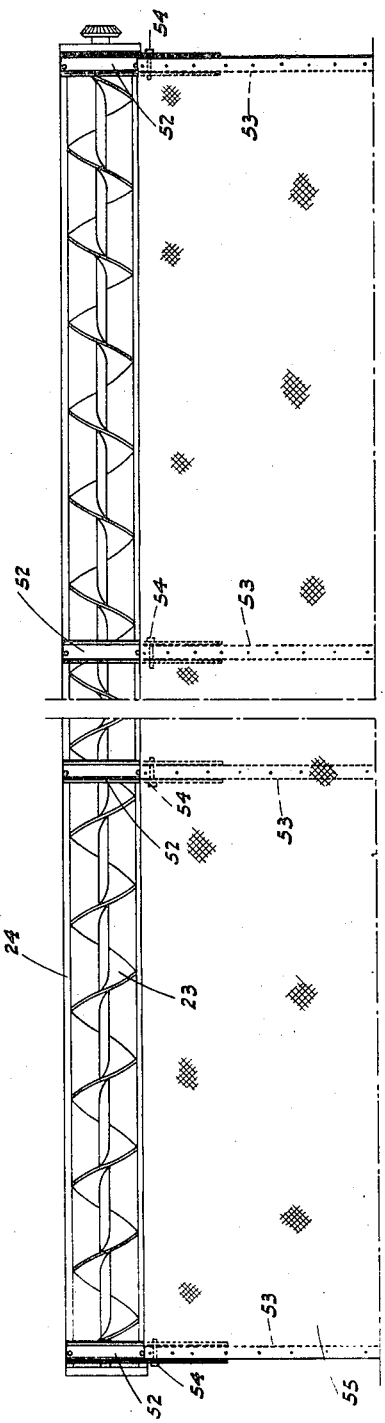
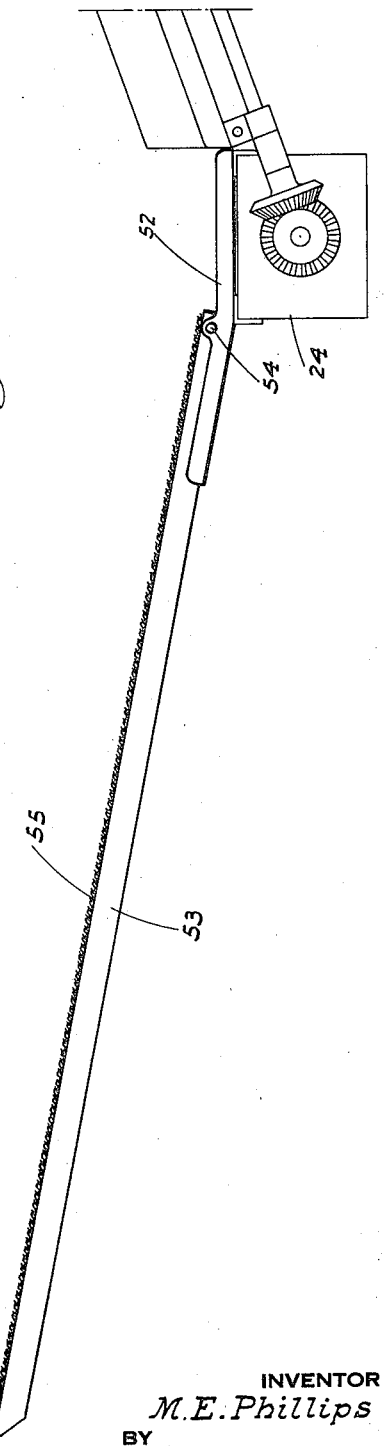
INVENTOR
M.E.Phillips
BY
ATTORNEYS Patented Oct. 16, 1945

2,386,881

UNITED STATES PATENT OFFICE 2,386,881

NUT HARVESTER

Maxwell E. Phillips, Stockton, Calif.

Application March 6, 1943, Serial No. 478,257

11 Claims. (Cl. 56—1)

This invention relates to apparatus for use in gathering or harvesting nuts of different kinds as well as to other orchard products which are harvested by knocking or shaking the same from the trees.

In the harvesting of walnuts, for instance—a crop for which the machine has been initially designed—it has heretofore been the general custom to harvest by two methods. One of these is to knock the nuts from the tree directly onto the ground, and the other is to knock them onto sheets spread under the tree.

The first mentioned method involves a great deal of manual labor, which is now scarce.

In addition to this labor problem there are other distinct disadvantages encountered in the use of this first method. One of these is that early falling nuts, already on the ground, and which are usually immature and defective, are mixed indiscriminately with the good nuts. Furthermore, if the crop is harvested in hot weather the nuts, with their hulls, will fall upon hot, sunbathed ground, and the heat will cause the moisture in the hulls to turn into a sweat or steam which has the effect of tending to cook the nut meats and spoiling the color and lowering the grade value. This will occur even though the nuts lay on the hot ground for only a few hours and is a condition very difficult to combat.

In picking the nuts from the ground it is impossible to tell the good nuts from those of the early immature drop or those so affected by heat and the same are therefore indiscriminately mixed. Then when they reach the packing house and are cracked for inspection, these conditions show up in the meats. As a result the commercial value of the crop as a whole, and which is determined by the average condition of the inspected nuts, is considerably lowered.

When the sheet method of gathering is employed it will be obvious that a large amount of leaves, sticks, and the like is necessarily knocked from the trees and onto the sheets, along with the nuts. It is difficult to separate this debris from the nuts and special blowers and separators must be used which delays the harvest and materially adds to the cost.

It is therefore the primary object of my invention to produce a nut harvester in which the foregoing difficulties will be overcome. To that end I have produced a harvesting machine in which the good merchantable nuts are never mixed with the early drop and defective nuts, and in which the nuts are never dropped to the ground nor exposed to the sun long enough to be affected by the sweating or cooking action above noted. Thus the proper grade is automatically maintained.

A further object is to produce a nut harvester which automatically and evenly cleans the accumulated debris from the nuts and delivers the clean nuts into the sacks.

A still further object of my invention is to provide a sacking platform of sufficient size to carry enough filled sacks so that they may be periodically unloaded and leaned one against the other in a group without sewing so that they may be handled and loaded in gathering with a minimum of labor.

Another object is to provide a harvester so constructed that the tractor driver has an unrestricted view of the tree trunk and ground and of the operators in the knocking towers, thus permitting a single operator to keep all operations at a maximum of efficiency.

To attain the above objects I provide a machine by means of which the nuts as they are knocked or shaken from the trees will be caught on an apron unit and delivered direct from said unit to a point of concentration for sacking on the machine, and I provide intermediate means whereby practically all leaves, twigs, etc. initially caught by the apron unit will be separated and discharged before the nuts reach the point of sacking.

Another object of the invention is to provide, in combination with said apron and cleaning means, a tower having operator stations at different levels and arranged relative to the general shape of the trees and to the apron unit so that workers at said stations are close to the trees and can conveniently knock nuts therefrom, and so that said nuts will then fall onto the apron unit.

I propose to construct such tower of readily available material and of inexpensive construction; to make it demountable for transportation from point to point over highways or otherwise or for passing under low power and telephone lines and the like; to make it of round, barrel like construction so that it may be crowded into trees with a minimum damage to limbs and twigs, as it will slide around same instead of catching into and twisting and breaking same; and finally one which will have rigid vertical strength so balanced as to allow operators' stations to be relatively offset to conform to tree shape, which is a feature impossible of attainment with the so called windmill type of tower. Also my tower is of such construction that th height of the tower may be readily increased and stations added vertically as the size of the tree increases with growth.

I further so construct the entire machine that it may be either moved in a substantially circular path about individual trees, or caused to travel straight along a row of trees, as the spacing of the trees in the orchard, their size, and other factors may render advisable.

These objects I accomplish by means of such structure and relative arrangement of parts as will fully appear by a perusal of the following specification and claims.

In the drawings similar characters of reference indicate corresponding parts in the several views:

Figure 2 is a rear end elevation of the same.

Figure 3 is a fragmentary transverse section of the tower, showing the removable and permanent portions thereof separated.

Figure 4 is a fragmentary transverse view showing the mounting of the apron and conveyor at their upper end.

Figure 5 is a cross section of the conveyor and adjacent portions of the apron unit taken on the line 5—5 of Fig. 1.

Figure 6 is a fragmentary transverse section on the line 6—6 of Fig. 1.

Figure 7 is a similar view taken on the line 7—7 of Fig. 1 the caster wheel being broken off.

Figure 8 is a fragmentary cross section of the auger conveyor showing a modified form of trough.

Figure 9 is a fragmentary top plan of the auger conveyor unit showing an apron extension mounted thereon.

Figure 10 is an end elevation of the same.

Figure 1:
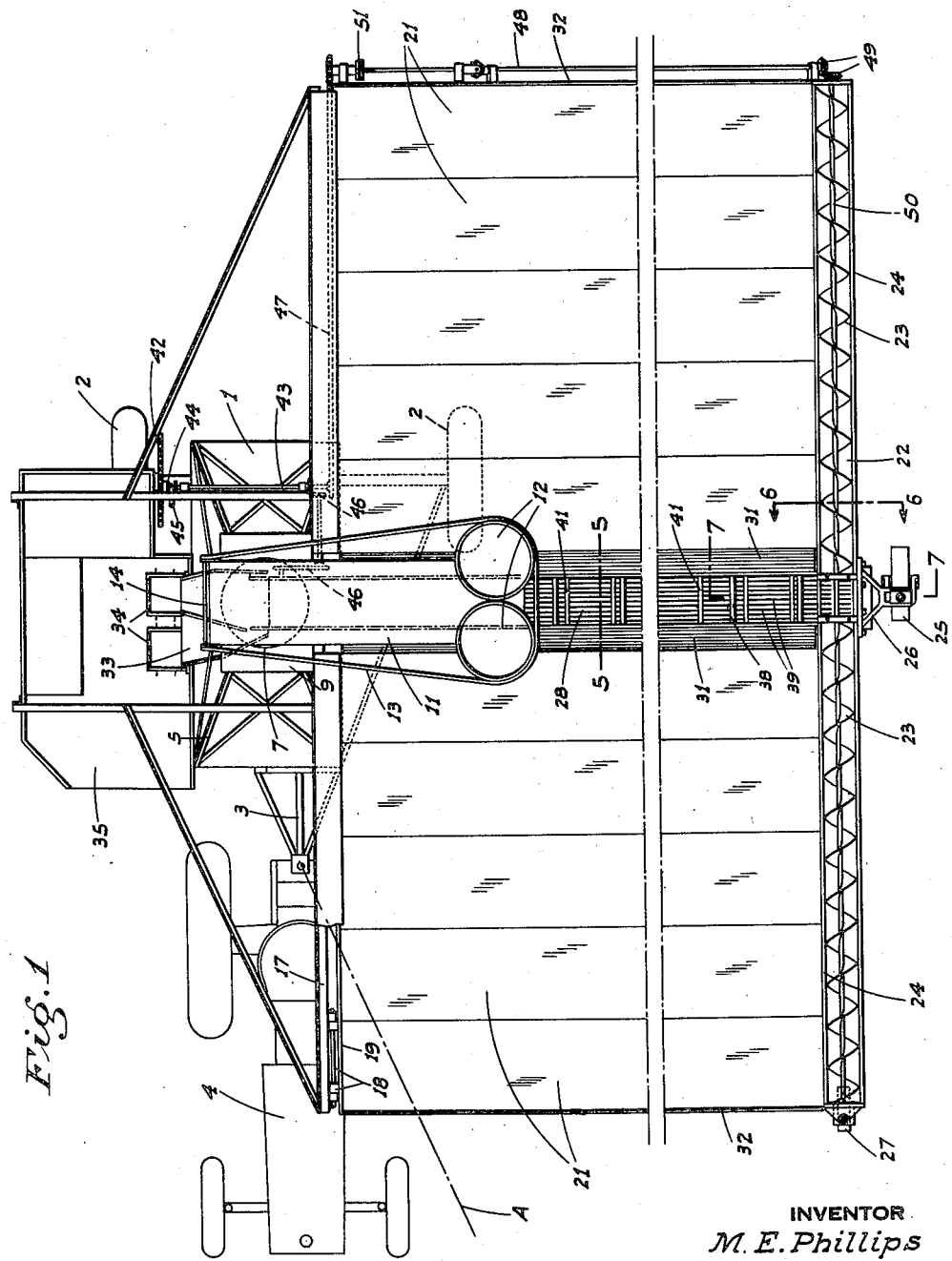
Figure 1 is a plan view of the improved machine, foreshortened.

Referring now more particularly to the characters of reference on the drawings, the machine comprises a platform or base 1 supported adjacent its rear end on a pair of wheels 2, and at its forward end is provided with a rigid draft tongue 3 swivelly connected, for relative horizontal swinging movement, to the rear end of a tractor 4. The draft tongue is centrally disposed relative to the wheel gauge, but the platform itself is disposed so that its outer side is relatively close to the outermost wheel, as shown in Figs. 1 and 2.

Upstanding from and rigid with the platform is a tower base 5, preferably of structural iron formation, on top of which is a rectangular open horizontal collar 6 (see Fig. 3). The main tower 7 is of cylindrical form and is preferably made up of a number of oil or similar drums which are relatively light but strong and easy and cheap to obtain. These drums are welded together and connected as well by vertical tie rods 8. The tower at its lower end is provided with a base plate 9 of larger area than the collar 6 to rest thereon; and a flange unit 10 depends from the plate to fit within the collar 6, said flange unit and collar having matching bolt holes 10a and 10b, as shown, so that the two may be detachably secured together.

A platform or runway 11 is secured on and projects laterally inward from the top of the tower, and at its outer end supports a pair of crow's-nests 12 (which may also be oil drums) and which are disposed in side by side relation lengthwise of the machine. Side rails 13 extend along the runway 11 between the crow's-nest and the upper end of a vertical ladder 14 secured against the outer side of the tower and depending to a level where it is accessible from the ground.

Another crow's-nest 15 is rigid with the tower on its inner side intermediate its ends and relatively close to the tower; while still another crow's-nest 16 is mounted in a similar position on the tower base. The vertical space of the crow's-nests is greater than the height of any worker so that there will be no occasion to stoop when occupying the same.

By reason of this arrangement the workers in the topmost crow's-nests are disposed close to the topmost branches of a tree and can conveniently see and knock nuts therefrom, while the workers in the crow's-nests below are similarly close to the lower branches for operation thereon. Due to the circular form of the tower it does not tend to damage tree limbs with which it may come in contact as the tower moves along a row of trees or about individual trees.

Due to the lateral offsetting of the supporting wheels relative to the overhanging crow's-nests, the tower is stabilized and there is no tendency for the same to upset. If relatively low trees are being worked on the main tower may be removed; the permanent crow's-nest 16 still remaining for the use of the operator.

Extending lengthwise of the machine and secured on the tower base 5 at a level adjacent the bottom of the crow's-nest 16, and for equal distances ahead and rearwardly of the tower is a beam 17 on which are detachably hinged, as at 18, the upper beams 19 of longitudinally spaced apron frames 20. These frames slope laterally inward from their upper end at a level approximately six feet from the ground, or sufficient for the tractor to swing thereunder to a termination relatively close to the ground, as shown in Fig. 2. This arrangement enables the apron to extend close to the trunk of a tree without interfering with any branches, and also enables nuts to freely roll down the plating 21 which covers the frames 20.

Along their lower edges the aprons discharge into the bottom troughs 22 of an auger conveyor unit 23, the apron frames being rigidly secured on the framing 24 of said conveyors. The augers are right and left-hand, as shown in Fig. 1, for the length of the two aprons, said augers and troughs being discontinued at the central portion of the space between the aprons.

The auger frames, and consequently the aprons, are supported from the ground by a caster wheel 25 disposed centrally of the length of the structure; said wheel being mounted on a cradle or bracket 26 which also strengthens the auger frame centrally of its length. To avoid possible digging of the front end of the auger unit into the ground in the event of the latter being uneven, an auxiliary caster wheel 27, disposed normally clear of the ground, is mounted at the front end of the auger.

Disposed between the aprons at a somewhat lower level is an endless conveyor, indicated generally at 28, and which extends from under the auger frame, where the troughs 22 are disconnected, to termination below and beyond the top beam 17. The conveyor at its lower end is pivotally supported by the side members of the cradle 26, as shown at 29, and adjacent its upper end is hung from swing bars 30 mounted on the beam 17 or similar fixed rigid part of the structure. (See Fig. 4). By reason of this arrangement the apron unit may swing vertically about the hinges 18 as ground inequalities at the wheels 2 and caster wheel 25 may necessitate, without binding the conveyor 28, while allowing the latter to be supported at its upper end independently of the apron.

The conveyor is narrower than the space between the aprons and deflector plates 31, overhanging the conveyor along its side edges but not connected therewith, extend downwardly from and are loosely secured on the adjacent side edges of the apron frames 20, which are here below the plating 21, as shown in Fig. 5. By reason of this arrangement, while the majority of the nuts roll down the apron into the auger conveyor, they are also free to roll off the adjacent side edges of the aprons and are then caught by the endless conveyor. The nuts are prevented from rolling off the opposite or outer edges of the aprons by upstanding flexible guards 32.

The conveyor 28 discharges at its upper end onto a divided chute 33 fixed with the tower base 5, and is adapted to feed alternately into sacks hung on sack hangers 34 of conventional form. These hangers are mounted in connection with the adjacent side wall of a compartment 35 extending laterally out from the side of the platform 1 opposite the apron and supported in connection with said platform and the tower base. The compartment, which is freely open at its forward end, is of sufficient size to receive and seat a sacking operator and to contain a supply of empty and filled sacks.

The endless conveyor 28 itself comprises endless side chains 36 running over sprockets 37, and right-angled cleats 38 extending between said chains at intervals, the angle of the cleats facing in the direction of travel of the conveyor, and being sharpened along their forward edges. The cleats ride on a grate comprising bars 39 extending lengthwise of the conveyor and spaced apart a distance less than the diameter of a normal nut but sufficiently to permit the passage of hulls etc. therebetween. At intervals blocks 41 are disposed between the bars flush therewith and supported on cross bars 40 which also support the bars 39. The upper trailing edges of the blocks 41 are sharpened, as shown in Fig. 7, and form fixed shearing blades cooperating with the movable shearing blades formed by the sharpened edges of the cleats 38. The chains 36 are somewhat closely confined under the overhanging side members M of the conveyor so that the cleats cannot appreciably lift from contact with the bars and blade forming blocks. By reason of this arrangement the cleats as they feed nuts, hulls, etc., engaged therewith along the grate, act to shear off any hulls, etc. which have projected between the bars 39 but for some reason are held from dropping, and thus cause such hulls to be discharged through the grate. As a result, practically all foreign matter is separated from the nuts before the latter are discharged from the upper end of the conveyor. The same shearing action may be obtained in connection with the operation of the auger conveyor, by making the button trough 22a thereof of slotted form, as shown at 22b in Fig. 8, and arranging the auger 23a itself with a sharpened edge closely contacting said trough.

In order to drive the endless and auger conveyors while the machine is in motion, an endless chain drive 42 connects one of the wheels 2 and a horizontal transversely extending shaft 43 journaled on the rear side of the tower base 5 (see Fig. 2). A hand controlled clutch 44 is interposed between the chain drive and the shaft, said clutch being operated by a shift lever 45 positioned convenient to the occupant of the compartment 35. The shaft 43, through the medium of bevel gearing and a chain drive unit 46, drives the conveyor 28 from its upper end; and through a chain drive 47 also drives another transverse shaft unit 48 extending along and journaled on the rear end of the rear apron frame. The shaft unit 48 is connected by bevel gearing 49 with the adjacent end of the auger shaft 50, and said shaft unit includes a yieldable friction clutch 51 so as to avoid possible breakage if the auger should become jammed.

In order to increase the nut catching area of the machine, in the event that it is being used with extra large trees, upwardly facing channel supports 52 are secured on top of the auger frame 24 at intervals and project laterally with a slight upward slope away from the apron frames 20. Relatively light wood bars 53 are supported in said channels and extend therebeyond, said bars being pivoted in connection with the channels for upward tilting toward the auger, by removable pins 54. An auxiliary apron 55 of canvas or the like, is secured on and extends between the bars. The pivot of the bars, which is at a point such that when tilted upwardly the canvas overhangs the augers, enables the nuts on the canvas to be discharged into the auger at desirable intervals without disposing the canvas at a sufficient slope to cause the nuts to roll off of themselves, and which would be impracticable.

In operation, with the nut knocking operators manning the various crow's-nests, another one in the compartment 35, and one operating the tractor, the latter is preferably steered so that it is disposed at an angle toward the apron unit approximately as shown at A, so that with advance of the tractor the machine will turn about a circle substantially concentric with the tree and as close to the same as the tower or auger conveyor will permit. While the machine thus moves the nuts are knocked off the tree by the occupants of the crow's-nests and without any attention on the part of the operator being necessary, the nuts are gathered, the hulls, etc., separated therefrom, and the nuts are fed to the sacking operator, who has control of such feeding of the nuts regardless of the movement of the machine, by reason of the proximity of the clutch operating lever 45.

While I have described the apparatus as a nut harvester, it is also adapted for use with harvesting other tree produce, such as French prunes, etc.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A nut harvester comprising in combination, a wheel supported tower movable along the ground and having a worker-supporting platform on top, a nut catching apron unit extending lengthwise of the harvester from ahead of to rearwardly of the tower and projecting laterally from one side thereof, the unit being disposed with a downward slope transversely of the harvester from adjacent the tower, means mounting the apron unit at its upper end in connection with the tower, a ground engaging support for the lower end of the apron unit and a steerable tractor swivelly connected to the harvester and projecting forwardly from adjacent the tower; the upper end of the apron unit being a sufficient distance above the ground to enable the tractor to be turned under the upper forward portion of the unit.

2. A harvester as in claim 1, in which said apron unit support is a caster wheel disposed substantially centrally of the length of the unit.

3. A harvester as in claim 1, in which said apron unit support is a caster wheel disposed substantially centrally of the length of the unit, and another caster wheel, normally clear of the ground, mounted at the forward lower end of the apron unit.

4. A nut harvester comprising a nut catching apron unit mounted for movement along the ground, said unit being disposed with a downward slope from one end and adapted to project under a tree to catch nuts falling from the tree, a conveyor unit mounted in fixed connection with and extending along the lower end of the apron unit to receive nuts rolling from the latter and a driven conveyor onto which the conveyor unit discharges, said driven conveyor being suspended adjacent the apron unit and extending upwardly from the conveyor unit to a termination in a horizontal plane adjacent that of the upper end of the apron unit.

5. A nut harvester comprising a nut catching apron unit mounted for movement along the ground, said unit being disposed with a downward slope from one end and adapted to project under a tree to catch nuts falling from the tree, conveyor means mounted in connection with and extending along the lower end of the apron unit to receive nuts rolling from the latter, a driven conveyor onto which said conveyor means discharges, said driven conveyor being mounted with the apron unit and extending upwardly from the conveyor means, an operator compartment mounted with the apron unit beyond and below the upper end of the same; and means delivering the nuts discharged from the driven conveyor into said compartment.

6. A nut harvester comprising a nut catching apron unit mounted for movement along the ground, said unit being disposed with a downward slope from one end and adapted to project under a tree to catch nuts falling from the tree, and comprising a pair of longitudinally spaced aprons, a conveyor unit fixed with the lower end of the apron unit and extending for its full length but being interrupted in the zone of separation of the aprons, the conveyor unit being arranged to feed from opposite directions to said zone, and a driven elevating conveyor disposed in the zone between the aprons to receive from the conveyor unit, said elevating conveyor extending from under the conveyor unit to an upper termination adjacent that of the upper end of the apron unit.

7. A structure as in claim 6, in which the driven conveyor is disposed throughout its length at a level below that of the corresponding portions of the apron unit; and deflector plates overhanging the side edges of the driven conveyor sloping down from and secured on the adjacent side edges of the aprons.

8. A nut harvester comprising a wheel supported base structure, a horizontal longitudinal beam fixed with the structure on one side and at a relatively high level above ground, an apron unit extending with a downward slope from said side of the structure and hinged at its upper end on said beam and a wheel supporting the apron unit at its lower end.

9. A nut harvester comprising a nut catching unit which includes a pair of horizontally spaced aprons disposed with a downward slope, from one end, conveyor means mounted with the aprons at their lower end to feed to the zone of separation between the aprons, a driven elevating conveyor disposed between the aprons and receiving from the conveying means, said conveyor being disposed throughout its length at a level below that of the corresponding portions of the aprons and deflector plates overhanging the side edges of the conveyor and sloping down from the adjacent side edges of the aprons.

10. A nut harvester comprising a wheel supported base structure including a horizontal beam on one side and at a relatively high level above ground, a nut catching apron extending with a downward slope from and hinged on said beam, a wheel supporting the apron at its lower end, a horizontal conveyor extending along the lower edge of the apron, an elevating conveyor extending along one side of the apron from under the first conveyor to a top termination beyond and below the beam, means hingedly supporting the elevating conveyor in connection with the horizontal conveyor adjacent the lower end of said elevating conveyor, and swing bars suspending the elevating conveyor adjacent its upper end from the base structure.

11. A nut harvester comprising a nut catching unit supported from the ground, said unit including a substantially flat apron disposed with a downward slope from one end and having its lower end straight and spaced from the ground, and a driven conveyor mounted in connection with and extending along said lower end of the apron and arranged to receive nuts rolling therefrom and convey such nuts to one side of the apron.

MAXWELL E. PHILLIPS.